US00RE39180E

(19) United States
(12) Reissued Patent
Colassi

(10) Patent Number: US RE39,180 E
(45) Date of Reissued Patent: Jul. 11, 2006

(54) TREADMILL BELT SUPPORT DECK

(76) Inventor: Gary J. Colassi, 1 Hampton Ct., Norton, MA (US) 02766

(21) Appl. No.: 10/247,663

(22) Filed: Sep. 19, 2002

Related U.S. Patent Documents

Reissue of:
(64) Patent No.: 6,123,646
Issued: Sep. 26, 2000
Appl. No.: 08/585,700
Filed: Jan. 16, 1996

(51) Int. Cl.
*A63B 22/02* (2006.01)

(52) U.S. Cl. ..... 482/54
(58) Field of Classification Search ..... 482/51, 482/54, 30, 31
See application file for complete search history.

(56) References Cited

U.S. PATENT DOCUMENTS

| | | | | | |
|---|---|---|---|---|---|
| 3,408,069 | A | | 10/1968 | Lewis | 272/66 |
| 3,606,320 | A | * | 9/1971 | Erwin, Jr. | 482/54 |
| 4,350,336 | A | * | 9/1982 | Hanford | 482/54 |
| 4,886,266 | A | | 12/1989 | Trulaske | 272/69 |
| 4,984,810 | A | | 1/1991 | Stearns et al. | 272/62 |
| 5,072,928 | A | * | 12/1991 | Stearns et al. | 482/54 |
| 5,279,528 | A | * | 1/1994 | Dalebout et al. | 482/54 |
| 5,336,144 | A | * | 8/1994 | Rodden | 482/54 |
| 5,382,207 | A | | 1/1995 | Skowronski et al. | 22/2 |
| 5,441,468 | A | * | 8/1995 | Deckers et al. | 482/54 |
| 5,454,772 | A | * | 10/1995 | Rodden | 482/54 |
| 5,474,510 | A | * | 12/1995 | Chen | 482/54 |
| 6,123,646 | A | | 9/2000 | Colassi | 482/54 |

FOREIGN PATENT DOCUMENTS

| | | |
|---|---|---|
| JP | 0339064 | 4/1991 |
| JP | 0715062 | 3/1995 |

OTHER PUBLICATIONS

Court Docket, Civil Action No. 02–11909 RWZ.
Defendant's Third Supplemental Responses to Plaintiff's First Set of Interrogatories (Nos. 1 to 8), Civil Action No. 02–11909 RWZ.
Defendant's Motion for Summary Judgment, Civil Action No. 02–11909 RWZ.
Defendant's Local Rule 56.1 Statement of Material Facts, Civil Action No. 02–11909 RWZ.

(Continued)

*Primary Examiner*—Stephen R. Crow
(74) *Attorney, Agent, or Firm*—Niro, Scavone, Haller & Niro

(57) ABSTRACT

A treadmill for walking exercise or medical testing has the the usual frame mounting rollers around which an endless belt is driven through a lower course and an upper course, the upper course of the belt being supported by an improved deck particularly adapted to rest on longitudinal support members of the frame.

One improvement lies in connecting one end of a planar deck to a anchor member by a flexible hinge, the member being attachable to the frame and the flexibility of the hinge allowing the deck to yield to the impact of a user's tread both vertically and longitudinally of the deck.

Many available treadmills are designed to receive a standard deck which is essentially a rectangular plank bounded by flat surfaces which enclose a prismatic volume. The present deck is rectangular and planar but has recesses rabbetted along its underside opposite the supporting frame members, the recesses being filled with strips of compressible, elastomeric material located within the cubic volume of the standard deck. Consequently the present deck can fit in the standard volume and further provide shock absorption. The deck is therefore useful, without modification, in treadmills of different manufacture.

27 Claims, 1 Drawing Sheet

OTHER PUBLICATIONS

Memorandum of Decision and Order dated Feb. 27, 2004, Civil Action No. 02–11909 RWZ.
Memorandum of Decision dated Jul. 7, 2004, Civil Action No. 02–11909 RWZ.
Complaint and Jury Demand, Civil Action No. 02–11909 RWZ.
Defendant's Answer to Complaint, Affirmative Defenses and Counterclaim, Civil Action No. 02–11909 RWZ.
Deposition of Gary J. Colassi, Jul. 8–9, 2003, Civil Action No. 02–11909 RWZ.
Defendant's Second Supplemental Responses to Plaintiff's First Set of Interrogatories (Nos. 1 to 8), Civil Action No. 02–11909 RWZ.
Memorandum in Support of Defendant's Motion for Summary Judgment, Civil Action No. 02–11909 RWZ.
Declaration of Raymond Giannelli in Support of Defendant's Motion for Summary Judgment, Civil Action No. 02–11909 RWZ.
Declaration of Peter T. Cobrin, Esl., in Support of Defendant's Motion for Summary Judgment, Civil Action No. 02–11909 RWZ.
Colassi's Memorandum in Response to Cybex's Motion for Summary Judgment, Civil Action No. 02–11909 RWZ.
Colassi's Local Rule 56.1 Response to Defendant's Statement of Material Facts, Civil Action No. 02–11909 RWZ.
Reply Memorandum in Further Support of Defendant's Motion for Summary Judgment, Civil Action No. 02–11909 RWZ.
Transcript of Deposition of Raymond Giannelli dated Sep. 24, 2003, in Civil Action No. 02–11909 RWZ.
Transcript of Hearing on Jun. 10, 2004, Civil Action No. 02–11909 RWZ.
Memorandum of Decision dated Aug. 3, 2004, Civil Action No. 02–11909 RWZ.
Supplemental Memorandum in Further Support of Defendant's Motion for Summary Judgment, Civil Action No. 02–11909 RWZ.
Expert Report of Michael Rosen, Apr. 27, 2005, Civil Action No. 02–11909 RWZ.

* cited by examiner

TREADMILL BELT SUPPORT DECK

Matter enclosed in heavy brackets [ ] appears in the original patent but forms no part of this reissue specification; matter printed in italics indicates the additions made by reissue.

CROSS-REFERENCE TO RELATED APPLICATION

*This is the parent of a continuation reissued application filed on Feb. 6, 2006, and accorded application Ser. No. 11,348,560.*

BACKGROUND OF THE INVENTION

A conventional treadmill for walking exercise or medical examination has a frame in which an endless belt is driven over two rollers through a lower course and an upper course which is walked on. To support the weight of the walker the upper course is supported underneath by a deck which has a flat or planar upper source smooth and waxed for least friction in its contact with the belt. Customarily the frame has portions at the sides of the upper belt course for securing the deck under the belt.

The deck is four to five feet long and fairly heavy. Previously it has been felt necessary to secure it to the treadmill frame by several bolts. All these bolts must be loosened and removed from the frame to lift the deck for replacement of the belt or to gain access to the belt drive motor and other operating parts below the deck. Additionally walking on the deck incurs shock both to the walker and damage to the frame.

I have found that conventional shock absorbing measures do not adequately prevent undue wear on the treadmill and the walker, and are difficult to effect in view of the many fasteners hitherto thought necessary to secure the deck to the treadmill frame.

Accordingly it is the object of the present invention to provide a treadmill deck which may be easily installed without modification of existing treadmills, which is attached to a treadmill frame with a minimum of fasteners, and which reduces shock and wear on the treadmill and its users.

SUMMARY OF THE INVENTION

According to the invention a deck for supporting the underside of a belt in a treadmill with a frame having rollers guiding the belt through a lower course and an upper course comprises a rigid planar member extending under and supporting the upper course of the belt and including means means to anchor the planar member on the treadmill frame, and a hinge flexibly connecting one end of the planar member to the anchor means so as to reduce shock on the walker and the treadmill frame. Shock may be further reduced by securing elastomerically compressible strips between the deck and the treadmill frame.

DRAWING

DESCRIPTION

Figure 1:
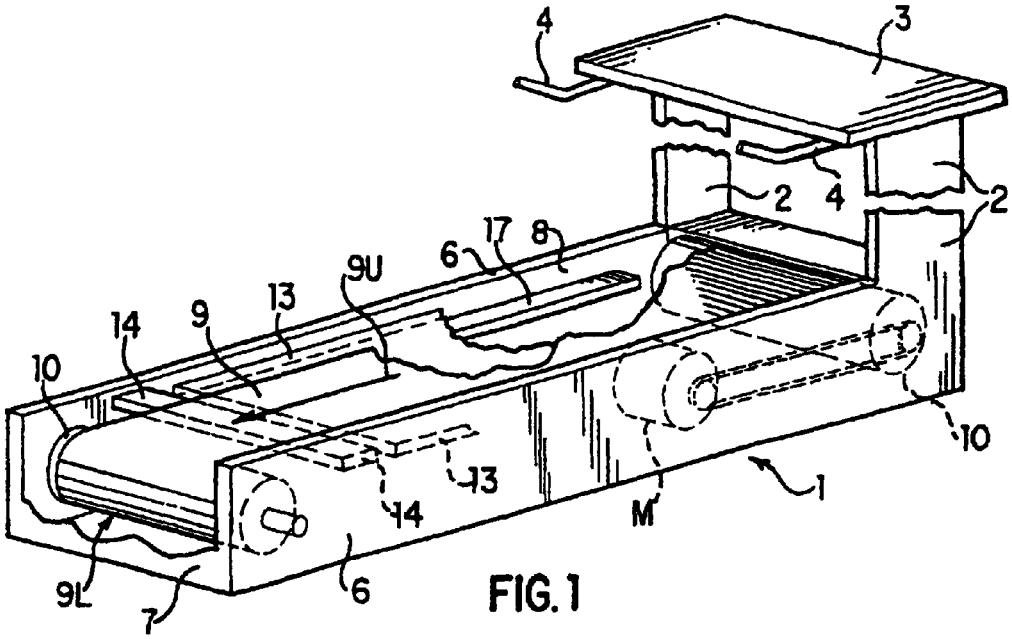
FIG. 1 is an isometric view of a treadmill including a deck according to the present invention.

An exercise treadmill shown in FIG. 1 consists of a frame 1 with uprights 2 carrying an instrument panel 3 and handgrips 4. The frame has sidewalls 6 and an endwall 7 enclosing a base compartment 8. Two rollers 10 are rotatively supported on the frame sidewalls 6. An endless belt 9 is guided around the rollers through a lower course 9L and an upper course 9U which ends at the rear of the treadmill away from the instrument panel. Under the upper course of the belt is a rigid, planar deck member 12 supporting the belt and the weight of the walker. The rollers may be driven by a motor M controlled at the panel 3, or they may be driven through the belt by the foot power of the walker.

Figure 2:
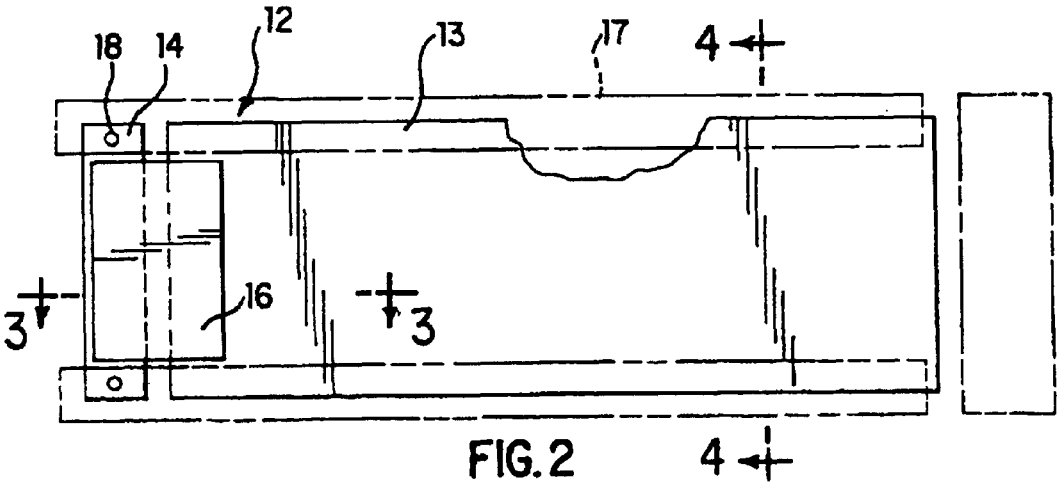
FIG. 2 is a plan view of the deck.
Figure 3:
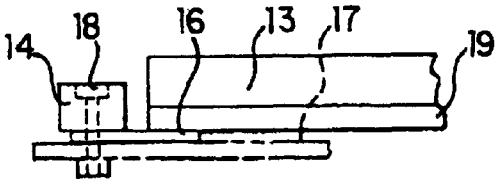
FIG. 3 is a section on line 3—3 of FIG. 2.
Figure 4:
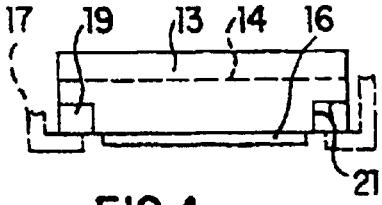
FIG. 4 is a section on line 4—4 of FIG. 2.

The deck 12, shown in more detail in FIGS. 2 to 4, comprises a flat plywood deck board 13 and an anchor board 14 both preferably of one inch birch plywood, with their upper, belt-supporting surfaces sanded, polished and waxed. The deck board is approximately four to five feet by twenty inches wide, and the anchor board is approximately one and a half by twenty inches.

According to one aspect of the present invention the deck board and the anchor board are connected by a hinge 16 of black rubber or equivalent synthetic elastomer. The hinge is approximately ¼ inch thick and 4 inches long by 16 inches wide, which is narrower than the deck board 20 inch width as will be explained. The hinge holds the deck board and anchor board spaced apart about a half inch. A portion of the shock of a user's feet will be applied lengthwise of the belt. Preferably the hinge is located, as shown, at the end of the upper course of the belt where it can absorb lengthwise shock by flexure as well as by its inherent longitudinal elasticity. The hinge 16 is attached to the deck and anchor boards preferably by staples and an adhesive such as K-Grip Solvent Cement supplied by Maple Leaf Sales, Plymouth, Minn. The planar deck board and the anchor board have upper surfaces flush with each other. This deck assembly comprising the deck board, anchor board and hinge is supplied as an independent part for installation in used or new treadmills.

As shown in FIG. 1 available treadmills are provided with a pair of parallel deck support ledge portions 17 depending from the sidewalls 6 of the frame 1 at each side of the upper course of the belt. The ledges have a lateral spacing which is matched by the width of the deck board 13. The deck board, however, is not fastened directly to the ledges, it is held in position by the hinge and anchor board which is fastened at its ends to the ledges 17 by two bolts 18. The hinge under the deck board is therefor narrower in width than the ledge spacing to clear the ledges as shown in FIG. 4.

The shock absorbing quality of the deck so far described is improved by inserting strips 19 of compressible, elastomeric foam, such as Poron microcellular urethane, between the bottom of the deck board and the frame ledges 17. It is preferable to locate rectangular foam strip in rectangular rabbets 21 recessed in the under outside edges of the deck board. The strips will then lie within the three planes which bound the planar deck member so that the deck and strips interchangeably fit into the same space as the deck without strips. The foam strips cooperate with the elastic hinge in absorbing shock at right angles to the deck but do not interfere with shock absorption by the hinge parallel to the deck.

It should be understood that the present disclosure is for the purpose of illustration only, and that the invention includes all modifications and equivalents falling within the appended claims.

What is claimed is:

1. For use in an exercise treadmill with a frame supporting rollers and a belt driven around the rollers through an upper course and a lower course, a deck for supporting the belt in its upper course, the deck comprising:

a rigid planar member adapted to extend under and adjacent the upper course;

means adapted to anchor the planar member on the treadmill frame;

and a flexible hinge yieldingly connecting one end of the planar member to the anchor means and adapted to resiliently absorb the shock of treading normal to and along the upper course.

2. A deck according to claim 1 wherein the hinge spaces the planar member from the anchor means.

3. A deck according to claim 1 wherein the hinge is connected to the planar means at the end of the upper course.

4. A deck according to claim 1 wherein the planar means and anchor means have upper surfaces flush with each other along the underside of the upper course.

5. A deck according to claim 1 wherein the planar member has elastomerically compressible strips extending along the underside of the planar member.

6. A deck according to claim 5 wherein the planar member has a solid prismatic volume bounded by planes and the elastomerically compressible strips are attached to the planar member within the bounds of the planes.

7. In an exercise treadmill having a frame supporting drive rollers, a belt guided [by the belt] around the rollers through an upper course and a lower course, a deck for supporting the belt in its upper course, the deck comprising:

a rigid planar member adapted to extend lengthwise under the upper course and including means to anchor;

an elastomerically compressible strip along the underside of the deck;

and a flexible hinge resiliently supporting one end of the planar member on the anchor means.

8. A deck according to claim 7 wherein the elastomerically compressible strips are bodies of elastomeric foam rubber.

9. A deck according to claim 7 wherein the planar member is bounded by prismatic planes and the elastomerically compressible strips are attached to the planar member within the bounds of the planes.

10. A deck according to claim 7 wherein the planar member has lengthwise rabbets in its underside edges parallel to the upper course, the elastomerically compressible strips being respectively secured in the rabbets.

11. An exercise treadmill comprising:

a frame supporting rollers;;

a belt guided around the rollers through an upper course and a lower course;

a deck supporting the belt in its upper course, the deck including:

a rigid planar member extending under and supporting the upper course of the belt;

means to anchor the planar member on the treadmill frame including means to fasten the anchor means to the frame; and a flexible hinge resiliently connecting one end of the planar member to the anchor means.

12. A treadmill according to claim 11 wherein the hinge spaces the planar member from the anchor means.

13. A treadmill according to claim 11 wherein the frame has parallel support portions at a fixed spacing on the frame at each side of the upper course and the hinge is narrower than the spacing.

14. A treadmill according to claim 11 wherein the planar member has elastomerically compressible strips extending along the underside of the planar member against the frame.

15. An exercise treadmill comprising:

a frame;

two spaced rollers rotatively mounted on the frame;

an endless belt guided by the rollers through an upper course and a lower course;

parallel support portions at a fixed spacing apart on the frame at each side of the upper course;

a rigid planar member resting on the support portions of the frame and extending under and supporting the upper course of the belt;

elastomerically compressible foam strips recessed in the outer edges of the underside of the planar member and resting on the parallel support portions;

an anchor [member] *means* under the upper course spaced from and parallel to one end of the planar member;

means to fasten the anchor means to the support portions of the frame;

and a flexible rubber hinge narrower than the spacing of the parallel frame support portions connecting one end of the planar member to the anchor member so as yieldingly to hold the planar member in a fixed horizontal position on the frame, but allowing the planar member to spring on the foam strips;

the planar member and anchor member constituting a separate, integral deck unit removable and replaceable in the treadmill, and secured in the treadmill solely by the anchoring means.

16. A deck according to claim 11 wherein the frame includes parallel portions at fixed spacing apart at each side of the upper course, and the hinge is narrower than the spacing of the support portions.

*17. For use in an exercise treadmill with a frame supporting rollers and a belt driven around the rollers through an upper course and a lower course, a deck for supporting the belt in its upper course, the deck being disposed between side rails of the frame and including:*

*a rigid planar portion adapted to extend under and adjacent the belt upper course to provide a support surface extending toward a rear end of the treadmill, on which upper course a user of the treadmill can tread while facing a front end thereof;*

*an anchor portion extending between the side rails for securing the rigid planar portion on the treadmill frame, said anchor portion and said planar portion being generally coplanar; and*

*a hinge portion more flexible than the rigid planar portion for forming a hinge yieldably connecting the rear end of the rigid planar portion to the anchor portion.*

*18. A deck according to claim 17, wherein the deck comprises a plywood board whereby the rigid planar portion and the anchor portion have upper surfaces flush with each other along the underside of the upper course.*

*19. A deck according to claim 17, wherein:*

*the rigid planar portion includes a separate planar member;*

*the anchor portion comprises separate anchor means adapted to anchor the planar member on the treadmill frame; and*

*the hinge portion comprises a separate flexible hinge that spaces the planar member from the anchor portion and connects the end of the planar member to the anchor means for resiliently absorbing the shock of treading normal to and along the upper course.*

*20. A treadmill according to claim 19, wherein:*

*the planar member comprises a plywood board disposed between the side rails;*

*the anchor means comprises a plywood anchor board spanning the side rails; and*

*the flexible hinge comprises a rubber sheet.*

*21. An exercise treadmill having a frame supporting drive rollers, a belt guided around the rollers through an upper course and a lower course, and a deck for supporting the belt in its upper course, the deck comprising:*

*a rigid planar member extending lengthwise under the belt upper course and including an anchor portion, wherein the planar member provides a support surface for the upper course extending toward a rear end of the treadmill, on which upper course a user of the treadmill can tread while facing a front end thereof, and the anchor portion extends between side rails of the frame and is generally coplanar with the planar member;*

*plural elastomerically compressible members supporting the underside of the deck on the frame; and*

*a flexible hinge resiliently supporting the rear end of the rigid planar member on the anchor portion.*

*22. A treadmill according to claim 21, wherein the elastomeric members support the underside of the rigid planar member on the side rails at locations spaced from the rear end of the rigid planar member.*

*23. A treadmill according to claim 22, wherein said elastomeric members comprise compressible strips.*

*24. A treadmill comprising:*

*a frame supporting rollers;*

*a belt guided around the rollers through an upper course and a lower course;*

*a deck supporting the belt in its upper course, the deck including:*

*a rigid planar member extending under and supporting the upper course of the belt to provide a support surface for the upper course extending toward a rear end of the treadmill, on which upper course a user of the treadmill can tread while facing a front end thereof,*

*an anchor portion extending between side rails of the frame and anchoring the planar member on the frame, said anchor portion and said planar portion being generally coplanar, and*

*a flexible hinge resiliently connecting the rear end of the rigid planar member to the anchor portion; and*

*means for fastening the anchor portion to the frame.*

*25. A treadmill according to claim 24, wherein:*

*the frame has parallel support portions at a fixed spacing; and*

*the treadmill further comprises elastomeric members supporting the underside of the rigid planar member against the frame.*

*26. A treadmill according to claim 25, wherein:*

*the anchor portion comprises anchor means separate from the rigid planar member to anchor the rigid planar member on the treadmill frame; and*

*the flexible hinge spaces the rigid planar member from the anchor means and connects the end of the planar member to the anchor means.*

*27. A treadmill according to claim 26, wherein:*

*the rigid planar member comprises a plywood board disposed between the side rails;*

*the anchor means comprises a plywood anchor board spanning the side rails; and*

*the flexible hinge comprises a rubber sheet.*

* * * * *